Figure 1:
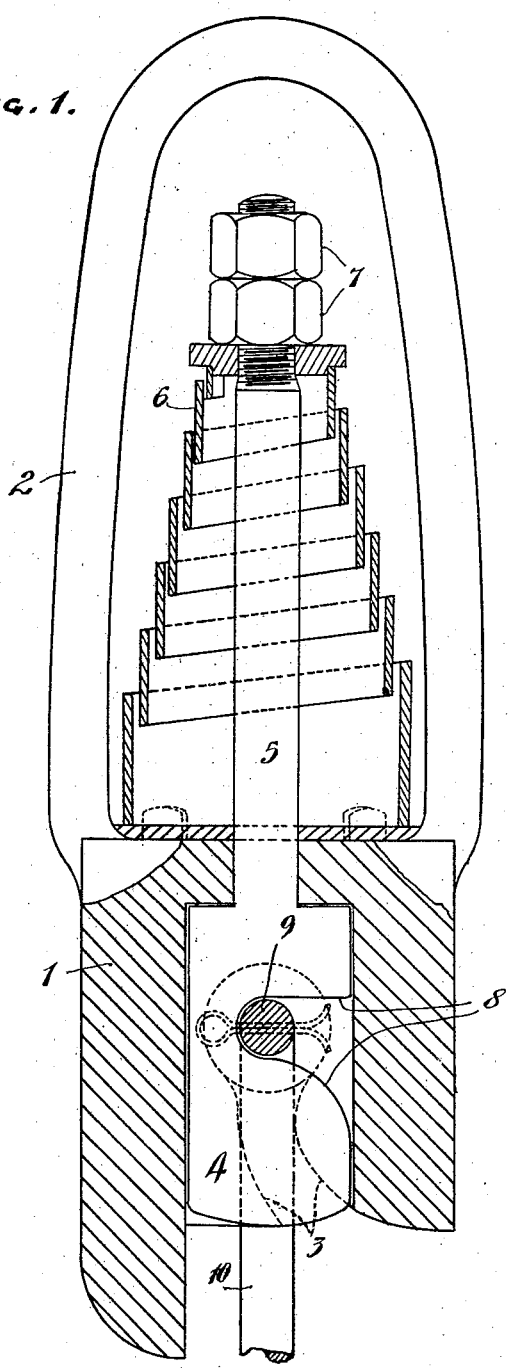

D. SHANKLAND.
TRACTION COUPLING.
APPLICATION FILED JAN. 24, 1918.

1,269,651.

Patented June 18, 1918.
2 SHEETS—SHEET 1.

INVENTOR:
DUNCAN SHANKLAND

BY

ATTORNEY.

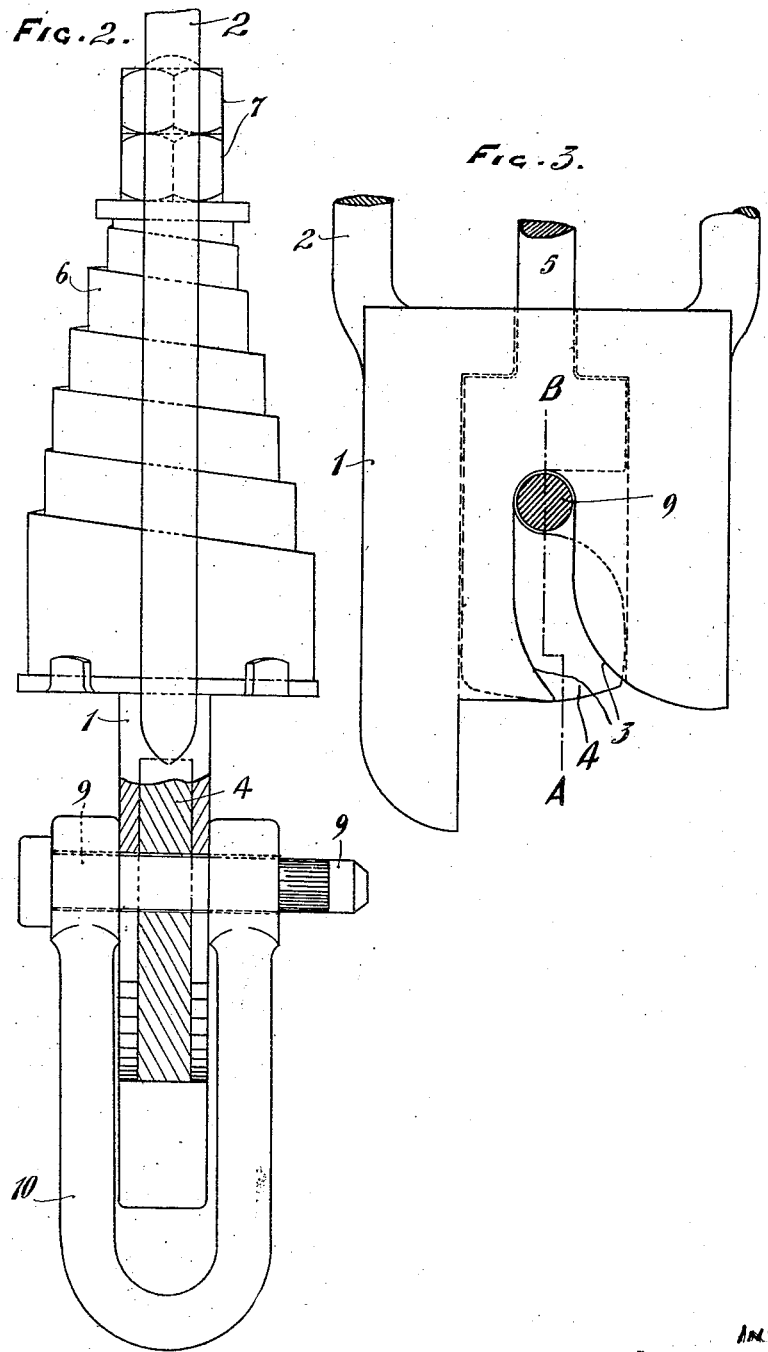

UNITED STATES PATENT OFFICE.

DUNCAN SHANKLAND, OF GLASGOW, SCOTLAND.

TRACTION-COUPLING.

1,269,651.  Specification of Letters Patent.  Patented June 18, 1918.

Application filed January 24, 1918. Serial No. 213,541.

*To all whom it may concern:*

Be it known that I, DUNCAN SHANKLAND, a subject of the King of the United Kingdom of Great Britain and Ireland, and residing at Glasgow, Scotland, have invented a certain new and useful Improvement in Traction-Couplings, of which the following is a specification.

This invention relates to an improved traction coupling, say for coupling a plow or other agricultural implement to a motor or other power-driven vehicle, and has for its object to provide a coupling which will automatically be disengaged should the implement meet with an obstruction which would cause it to be injured.

A coupling according to the invention comprises, broadly, a slotted coupling element, a slotted member movable relatively to said element, spring means tending to maintain said element and said member in a given relative position, and a second coupling element having means for engagement with the slots in said first mentioned element and said slotted member, and disengageable when the spring means is stressed beyond a predetermined limit.

In the accompanying drawings Figure 1 is a part section part outside view of a coupling according to the invention. Fig. 2 is a view at right angles to Fig. 1 being in part a section on the line A—B of Fig. 3. Fig. 3 is a detail side elevation.

The coupling shown comprises a frame 1 provided at one end with a loop-like member 2 presenting a means of attachment for a cable or the like connectible to the driving or the driven vehicle. At the opposite end the frame is formed with an open-ended cam slot 3.

Fitted to slide within the frame 1 is a plate or block 4 formed with a bolt-like extension 5 accommodated within the loop 2 and enveloped by a spring 6 of which the initial stress may be varied by adjustment of nuts 7. The plate or block 4 is formed with a slot 8 partly in register with the slot 3 in the frame, affording an orifice for passage of a pin 9 engaging a shackle 10 for engagement by a cable or the like connectible to the other vehicle.

It will be understood that when the coupling is in use the member 5 will be in tension and the spring 6 in compression, the spring 6 resisting such movement of the plate 4 and member 5 relatively to the frame 1 as would cause uncoupling. Should, however, a serious obstruction be met with, the plate 4 and therewith the member 5 will be slid relatively to the frame 1 so that the end of the slot 8 will be exposed and the shackle pin 9 disengaged.

It will be understood that the construction may be modified without departure from the invention.

What I claim is:—

The hereindescribed traction coupling, comprising, in combination, a coupling element formed with a cam slot, a plate slidably fitted to said element, said plate being formed with a slot partly in register with said cam slot and having an extension in the form of a bolt, a spring enveloping said extension and a shackle pin passing through said slots.

In testimony whereof I have signed my name to this specification in the presence of two subscribing witnesses.

DUNCAN SHANKLAND.

Witnesses:
 HENRY MASON,
 FLORENCE HOUSTON.

Copies of this patent may be obtained for five cents each, by addressing the "Commissioner of Patents, Washington, D. C."